United States Patent
Noda et al.

(10) Patent No.: US 10,151,344 B2
(45) Date of Patent: Dec. 11, 2018

(54) TURBOCHARGER

(71) Applicant: Mitsubishi Heavy Industries Engine & Turbocharger, Ltd., Kanagawa (JP)

(72) Inventors: Yoshitomo Noda, Tokyo (JP); Masaki Tojo, Tokyo (JP)

(73) Assignee: MITSUBISHI HEAVY INDUSTRIES ENGINE & TURBOCHARGER, LTD., Kanagawa (JP)

(*) Notice: Subject to any disclaimer, the term of this patent is extended or adjusted under 35 U.S.C. 154(b) by 0 days.

(21) Appl. No.: 15/519,969

(22) PCT Filed: May 29, 2015

(86) PCT No.: PCT/JP2015/065570
§ 371 (c)(1),
(2) Date: Apr. 18, 2017

(87) PCT Pub. No.: WO2016/063565
PCT Pub. Date: Apr. 28, 2016

(65) Prior Publication Data
US 2017/0314616 A1    Nov. 2, 2017

(30) Foreign Application Priority Data
Oct. 24, 2014 (JP) ................. 2014-217029

(51) Int. Cl.
*F16C 27/04* (2006.01)
*F16C 19/18* (2006.01)
(Continued)

(52) U.S. Cl.
CPC .......... *F16C 27/045* (2013.01); *F16C 33/605* (2013.01); *F16C 33/664* (2013.01);
(Continued)

(58) Field of Classification Search
CPC ................ F16C 2360/24; F16C 33/605; F16C 33/6651; F16C 33/6674; F16C 27/045;
(Continued)

(56) References Cited

U.S. PATENT DOCUMENTS 4,708,602 A * 11/1987 McEachern, Jr. ...... F01D 25/164
  384/474
4,721,441 A *  1/1988 Miyashita ............. F01D 25/164
  384/518
(Continued)

FOREIGN PATENT DOCUMENTS

CN    102388209 A    3/2012
CN    103261721 A    8/2013
(Continued)

OTHER PUBLICATIONS

Machine Translation of JP 2014-043920 (Year: 2014).*
(Continued)

*Primary Examiner* — Alan B Waits
(74) *Attorney, Agent, or Firm* — Birch, Stewart, Kolasch & Birch, LLP

(57) ABSTRACT

A turbocharger comprises: a rolling bearing provided with a plurality of rolling elements arranged between a raceway formed on an inner ring and a raceway formed on an outer ring; and a housing for holding the outer ring. The housing is provided with: a first dam for restricting the outflow of a lubricant through a first discharge passage for discharging the lubricant from the outer ring; and a second dam for restricting the outflow of the lubricant through a second discharge passage for discharging the lubricant from an opening formed so as to be in communication with an axially intermediate portion of the outer ring and with a peripheral wall of a space.

10 Claims, 4 Drawing Sheets

(51) Int. Cl.
*F16C 33/66* (2006.01)
*F16C 33/60* (2006.01)
*F02B 39/14* (2006.01)

(52) U.S. Cl.
CPC ...... *F16C 33/6651* (2013.01); *F16C 33/6674* (2013.01); *F16C 33/6681* (2013.01); *F02B 39/14* (2013.01); *F16C 19/184* (2013.01); *F16C 2226/60* (2013.01); *F16C 2360/24* (2013.01)

(58) Field of Classification Search
CPC .. F16C 19/184; F16C 33/664; F16C 33/6682; F02B 39/14
See application file for complete search history.

(56) References Cited

U.S. PATENT DOCUMENTS

| | | | | |
|---|---|---|---|---|
| 4,943,170 | A | * | 7/1990 | Aida ............... F01D 25/164 384/518 |
| 4,983,050 | A | * | 1/1991 | Aida ............... F01D 25/164 384/495 |
| 4,997,290 | A | * | 3/1991 | Aida ............... F01D 25/164 384/474 |
| 5,028,150 | A | | 7/1991 | Kronenberger et al. |
| 9,879,689 | B2 | * | 1/2018 | Kocher ............. F04D 29/102 |
| 2007/0003175 | A1 | * | 1/2007 | Petitjean ............ F01D 25/16 384/322 |
| 2010/0132358 | A1 | * | 6/2010 | Purdey ............. F01D 25/166 60/605.3 |
| 2010/0172739 | A1 | * | 7/2010 | Arnold ............. F16C 19/184 415/111 |
| 2011/0176907 | A1 | * | 7/2011 | Groves ............. F01D 25/166 415/1 |
| 2011/0200422 | A1 | * | 8/2011 | Gutknecht ........... F01D 25/16 415/1 |
| 2012/0033908 | A1 | * | 2/2012 | House .............. F01D 25/16 384/476 |
| 2012/0045326 | A1 | * | 2/2012 | House .............. F01D 25/16 415/229 |
| 2012/0051906 | A1 | * | 3/2012 | House .............. F01D 25/16 415/229 |
| 2012/0308366 | A1 | * | 12/2012 | Petitjean ............ F01D 25/16 415/170.1 |
| 2013/0202432 | A1 | * | 8/2013 | House .............. F01D 25/16 415/229 |
| 2013/0259416 | A1 | * | 10/2013 | Schmidt ............. F16C 19/184 384/490 |
| 2014/0079572 | A1 | | 3/2014 | Iwata et al. |
| 2014/0086731 | A1 | * | 3/2014 | Schmidt ............. F01D 25/125 415/170.1 |
| 2017/0335717 | A1 | * | 11/2017 | Isogai .............. F01D 25/164 |
| 2018/0051744 | A1 | * | 2/2018 | Ammon ............. F01D 25/162 |
| 2018/0051750 | A1 | * | 2/2018 | Ozawa .............. F01D 25/162 |

FOREIGN PATENT DOCUMENTS

| | | | |
|---|---|---|---|
| CN | 103477099 A | | 12/2013 |
| DE | 10 2011 007 250 A1 | | 10/2012 |
| EP | 1302636 A1 | | 4/2003 |
| JP | 60-43137 U | | 3/1985 |
| JP | 60-78942 U | | 6/1985 |
| JP | 61-134536 U | | 8/1986 |
| JP | 2-31302 U | | 2/1990 |
| JP | 2-70923 A | | 3/1990 |
| JP | 2002-39191 A | | 2/2002 |
| JP | 2006-37853 A | | 2/2006 |
| JP | 2006-90402 A | | 4/2006 |
| JP | 2014-43920 A | | 3/2014 |
| JP | 2014043919 A * | 3/2014 | .......... F16C 33/6659 |
| JP | 2014043920 A * | 3/2014 | .......... F16C 27/045 |
| WO | WO 2012/079883 A1 | | 6/2012 |
| WO | WO 2013/126231 A1 | | 8/2013 |

OTHER PUBLICATIONS

Machine Translation of JP 2014-043919 (Year: 2014).*
Written Opinion of the International Searching Authority and International Search Report (Forms PCT/ISA/237 and PCT/ISA/210), dated Sep. 1, 2015, for International Application No. PCT/JP2015/065570, with an English translation.

* cited by examiner

TURBOCHARGER

TECHNICAL FIELD

The present invention relates to a turbocharger including a rolling bearing.

Priority is claimed on Japanese Patent Application No. 2014-217029, filed Oct. 24, 2014, the content of which is incorporated herein by reference.

BACKGROUND ART

Turbochargers having a configuration in which a rotating shaft is supported by a rolling bearing have been known from the related art. To describe specifically, a turbocharger includes a housing having a tubular space for housing the rolling bearing. By fitting an outer ring of the rolling bearing into the space of the housing, the rolling bearing is installed in the housing. The rotating shaft of the turbocharger is inserted through a rotatable inner ring. The rotating shaft is made rotatable relative to the housing.

This type of turbocharger includes a structure for supplying oil that is lubricant to the rolling bearing. To describe specifically, in the turbocharger in which the rotating shaft extends in a horizontal direction, an oil supply flow passage that communicates with the space of the above-described housing is formed in an upper portion (a portion up to an upper half or so in a sectional view) of the housing. An oil supply port that communicates with the oil supply flow passage is formed in an upper portion of the outer ring of the rolling bearing. The oil supplied to the oil supply flow passage flows into the inside of the outer ring through the oil supply port, flows along an inner peripheral surface of the outer ring or an outer peripheral surface of the inner ring, and is supplied to between rolling elements (balls) of the rolling bearing, and raceways. A minute clearance is between an inner peripheral surface of the space of the above-described housing and an outer peripheral surface of the outer ring of the rolling bearing. The oil enters this clearance from the oil supply flow passage. The oil flows around an outer periphery of the outer ring, and consequently, an oil film is interposed between the inner peripheral surface of the space of the housing and the outer peripheral surface of the outer ring. Accordingly, the turbocharger can obtain a damping effect (an effect of damping vibration) caused by a squeeze film damper phenomenon of this oil film at the time of generation of vibration. Both ends of the outer ring in an axial direction are open, respectively. These opening ends communicate with an oil discharge flow passage formed in a lower portion of the housing. The oil supplied to between the rolling elements of the rolling bearing and the raceways flows out to the oil discharge flow passage through the opening ends on both sides of the outer ring.

Meanwhile, the following PTL 1 discloses a turbocharger including a rolling bearing in which an oil reservoir recess is formed in the outer peripheral surface of the outer ring (bearing housing) in order to reserve lubricating oil (lubricant) at the outer periphery of the outer ring (bearing housing).

CITATION LIST

Patent Literature

[PTL 1] Japanese Unexamined Patent Application Publication No. 2006-90402

SUMMARY OF INVENTION

Technical Problem

However, in the related-art turbocharger disclosed in above-described PTL 1, an oil discharge hole is formed at a bottom part of the space (casing) that houses the outer ring (bearing housing). In a case where an engine has stopped and oil has not been supplied over a long period of time, the lubricating oil flows out of the oil discharge hole. In the turbocharger, consequently, the lubricating oil is drained and is brought into a dry state between the rolling elements and the raceways or between the outer ring (bearing housing) and the space (casing). Oil supply is later than the rotation of the rotating shaft of the turbocharger at the time of starting. For this reason, the rotating shaft rotates in a dry state or in a state where an oil is insufficient, until newly supplied oil reaches between the rolling elements and the raceways or between the outer ring (bearing housing) and the space (casing). If the rotating shaft rotates in such the state, a damping effect is not obtained, and vibration becomes large. As a result, in the turbocharger, there are concerns that malfunctions such that noise becomes large, seizure occurs, damage, such as wear or cracking, occurs, or the rolling elements are separated, may occur.

The invention provides a turbocharger that can prevent the above-mentioned malfunctions resulting from the supply delay of the lubricant at the time of starting.

Solution to Problem

The invention adopts the following means in order to solve the above problems. A turbocharger related to a first aspect of the invention is a turbocharger including a rotating shaft that is combined with a turbine rotor and a compressor rotor, which are disposed side by side, respectively, and rotates together with the turbine rotor and the compressor rotor; a rolling bearing that includes an inner ring combined with the rotating shaft, an outer ring disposed on a radial outer side of the inner ring, and a plurality of rolling elements sandwiched between a raceway of the inner ring and a raceway of the outer ring, and supports the rotating shaft; a housing that has a space which houses the rolling bearing and holds the outer ring fitted into this space; a lubricant supply structure for supplying a lubricant to a space between the outer ring and the inner ring and to a space between an outer peripheral surface of the outer ring and an inner peripheral surface of the space, respectively; and a lubricant discharge structure having a first discharge passage for discharging the lubricant from opening ends of the outer ring on both sides in an axial direction, and a second discharge passage for discharging the lubricant from the openings aligned and formed so as to communicate with an axially intermediate portion of the outer ring and a peripheral wall part of the space, respectively. The housing includes a first dam that is disposed adjacent to a lower portion of the opening end of the outer ring and restricts an outflow of the lubricant through the first discharge passage, and a second dam that is disposed in the openings formed in the outer ring and the peripheral wall part of the space and restricts an outflow of the lubricant through the second discharge passage.

According to the turbocharger of this aspect, the lubricant is supplied to the space between the outer ring and the inner ring of the rolling bearing by the lubricant supply structure during the operation of the turbocharger. For that reason, the lubricant is applied between the raceways and the rolling elements, and the friction between the raceways and the rolling elements is reduced. The lubricant is also supplied to a clearance between the outer peripheral surface of the outer ring and the inner peripheral surface of the space by the lubricant supply structure. For that reason, a lubricant film is formed on the outer peripheral surface of the outer ring. A damping effect is obtained by a squeeze film damper phenomenon of this lubricant film. Simultaneously with the supply of the above-described lubricant, by virtue of the first discharge passage of the lubricant discharge structure, the lubricant flows over the first dam and is discharged from the opening ends of the outer ring on both sides in the axial direction to the outside of the rolling bearing. In addition, by virtue of the second discharge passage of the lubricant discharge structure, the lubricant flows over the second dam and is discharged from the opening of the axially intermediate portion of the outer ring and the opening of the peripheral wall part of the space to the rolling bearing.

Meanwhile, in a case where the operation of the turbocharger has stopped and the supply of the lubricant has stopped, most of the lubricant supplied until then is discharged by the lubricant discharge structure. However, some lubricant is dammed by the first dam and the second dam, and stagnates at the bottom inside the outer ring or the bottom of the space without being discharged. When the turbocharger has started after the stop of supply of the lubricant over a long period of time, even if the supply delay of the lubricant occurs, the lubricity between the raceways and the rolling elements is sufficiently guaranteed from immediately after the starting of the turbocharger by the lubricant that has stagnated at the bottom inside the outer ring. Simultaneously, a lubricant film is formed between the outer peripheral surface of the outer ring and the inner peripheral surface of the space from immediately after the starting of the turbocharger by the lubricant that has stagnated at the bottom of the space. As a result, the damping effect of vibration is obtained by this lubricant film.

Particularly, according to the turbocharger of this aspect, at the time of the damping, the lubricant between the outer peripheral surface of the outer ring and the inner peripheral surface of the space escapes after flowing over the second dam without escaping from the opening formed in the space. For this reason, compared to a case where the lubricant between the outer peripheral surface of the outer ring and the inner peripheral surface of the space escapes from the opening formed in the space, escape resistance of the lubricant at the time of the damping becomes large. As a result, the damping effect can be improved.

In the turbocharger related to a second aspect of the invention based on the first aspect, a configuration may be adopted in which the second dam is formed by a perforated pin including a fastening part fastened to the opening formed in the peripheral wall part of the space, an insertion part inserted into the inside of the opening formed in the outer ring, and a discharge hole having one end open to the space between the outer ring and the inner ring and having the other end open to the outside of the space.

In this configuration, the perforated pin functions as a detent member (positioning member) of the outer ring. That is, the rotation of the outer ring around a relative central axis with respect to the housing is restricted by the above-described perforated pin even if a shape for positioning in the outer ring or the housing is not formed. The outer ring is positioned within the space at the position around a predetermined central axis.

A turbocharger related to a third aspect of the invention includes a rotating shaft that is combined with a turbine rotor and a compressor rotor, which are disposed side by side, respectively, and rotates together with the turbine rotor and the compressor rotor; a rolling bearing that includes an inner ring combined with the rotating shaft, an outer ring disposed on a radial outer side of the inner ring, and a plurality of rolling elements sandwiched between a raceway of the inner ring and a raceway of the outer ring, and supports the rotating shaft; a housing that has a space which houses the rolling bearing and holds the outer ring fitted into this space; a lubricant supply structure for supplying a lubricant to a space between the outer ring and the inner ring and to a space between an outer peripheral surface of the outer ring and an inner peripheral surface of the space, respectively; and a lubricant discharge structure having a first discharge passage for discharging the lubricant from opening ends of the outer ring on both sides in an axial direction, and a second discharge passage for discharging the lubricant from the openings aligned and formed so as to communicate with an axially intermediate portion of the outer ring and a peripheral wall part of the space, respectively. The housing is provided with a first dam that is disposed adjacent to a lower portion of the opening end of the outer ring and restricts an outflow of the lubricant through the first discharge passage. The openings formed in the peripheral wall part of the outer ring and the space are located at side parts of the outer ring and the space between bottom parts of the outer ring and the space and top parts of the outer ring and the space.

According to the turbocharger of this aspect, the lubricant is supplied to the space between the outer ring and the inner ring of the rolling bearing by the lubricant supply structure during the operation of the turbocharger. For that reason, the lubricant is applied between the raceways and the rolling elements, and the friction between the raceways and the rolling elements is reduced. The lubricant is also supplied to the clearance between the outer peripheral surface of the outer ring and the inner peripheral surface of the space by the lubricant supply structure. For that reason, a lubricant film is formed on the outer peripheral surface of the outer ring. A damping effect is obtained by a squeeze film damper phenomenon of this lubricant film. Simultaneously with the supply of the above-described lubricant, by virtue of the first discharge passage of the lubricant discharge structure, the lubricant flows over the first dam and is discharged from the opening ends of the outer ring on both sides in the axial direction to the outside of the rolling bearing. In addition, by virtue of the second discharge passage of the lubricant discharge structure, the lubricant is discharged from the opening of the axially intermediate portion of the outer ring and the opening of the peripheral wall part of the space to the rolling bearing.

Meanwhile, in a case where the operation of the turbocharger has stopped and the supply of the lubricant has stopped, most of the lubricant supplied until then is discharged by the lubricant discharge structure. Meanwhile, the opening of the axially intermediate portion of the outer ring is located at the side part of the outer ring, and the opening of the space is located at the side part of the space. For that reason, some lubricant dammed by the first dam stagnates at the bottom inside the outer ring or the bottom of the space without being discharged from the opening. When the turbocharger has started after the stop of supply of the lubricant over a long period of time, even if the supply delay of the lubricant occurs, the lubricity between the raceways and the rolling elements is sufficiently guaranteed from immediately after the starting of the turbocharger by the lubricant that has stagnated at the bottom inside the outer ring. Simultaneously, a lubricant film is formed between the outer peripheral surface of the outer ring and the inner peripheral surface of the space from immediately after the starting of the turbocharger by the lubricant that has stagnated at the bottom of the space. As a result, the damping effect of vibration is obtained by this lubricant film. Particularly, according to the turbocharger of this aspect, it is not necessary to use additional components, and the number of components does not increase.

In the turbocharger related to a fourth aspect of the invention based on any one of the first to third aspects, a configuration may be adopted in which the first dam has a circular-arc shape centered on a central axis of the rotating shaft.

According to this configuration, high robustness over the posture of the turbocharger is provided. For example, a case where the operation of the turbocharger has stopped and the supply of the lubricant has stopped in a state where the posture of the turbocharger is inclined so as to rotate around an axis of the rotating shaft is assumed. Even in such a case, if the inclination degree of the turbocharger is within a range of a central angle of a circular arc in the circular-arc first dam, the lubricant is dammed by a portion of the circular-arc first dam, and the lubricant stagnates at the bottom inside the outer ring or the bottom of the space.

In the turbocharger related to a fifth aspect of the invention based on any one of the first to fourth aspects, a configuration may be adopted in which a height position of a top part of the first dam is equal to a height position of a region in an inner peripheral surface of the outer ring closer to an axial inner side than the rolling elements.

According to this configuration, during the operation of the turbocharger, a sufficient amount of lubricant flows over the first dam and is discharged from the opening ends of the outer ring. In addition, after the supply of the lubricant has stopped, the lubricant is sufficiently dammed by the first dam. Accordingly, a sufficient amount of lubricant can be made to stagnate at the bottom inside the outer ring or the bottom of the space. While guaranteeing the lubricity between the raceways and the rolling elements or securing the lubricant film between the outer peripheral surface of the outer ring and the inner peripheral surface of the space from immediately after the starting of the turbocharger, the lubricant discharge performance during the operation of the turbocharger can also be sufficiently guaranteed. As a result, an increase in bearing loss or a temperature rise resulting from insufficient discharge of the lubricant can be prevented.

Advantageous Effects of Invention

According to the turbocharger of the invention, even in a case where the supply of the lubricant has stopped over a long period of time, the lubricant is secured between the rolling elements and the raceways and between the outer peripheral surface of the outer ring and the inner peripheral surface of the space, from immediately after starting. For that reason, the damping effect can be obtained from immediately after starting. As a result, noise can be reduced, and malfunctions such that seizure occurs, damage, such as wear or cracking, occurs, or the rolling elements are separated, can be prevented.

DESCRIPTION OF EMBODIMENTS

Hereinafter, a first embodiment and a second embodiment of a turbocharger related to the invention will be described in detail with reference to the drawings.

First Embodiment

Figure 1:
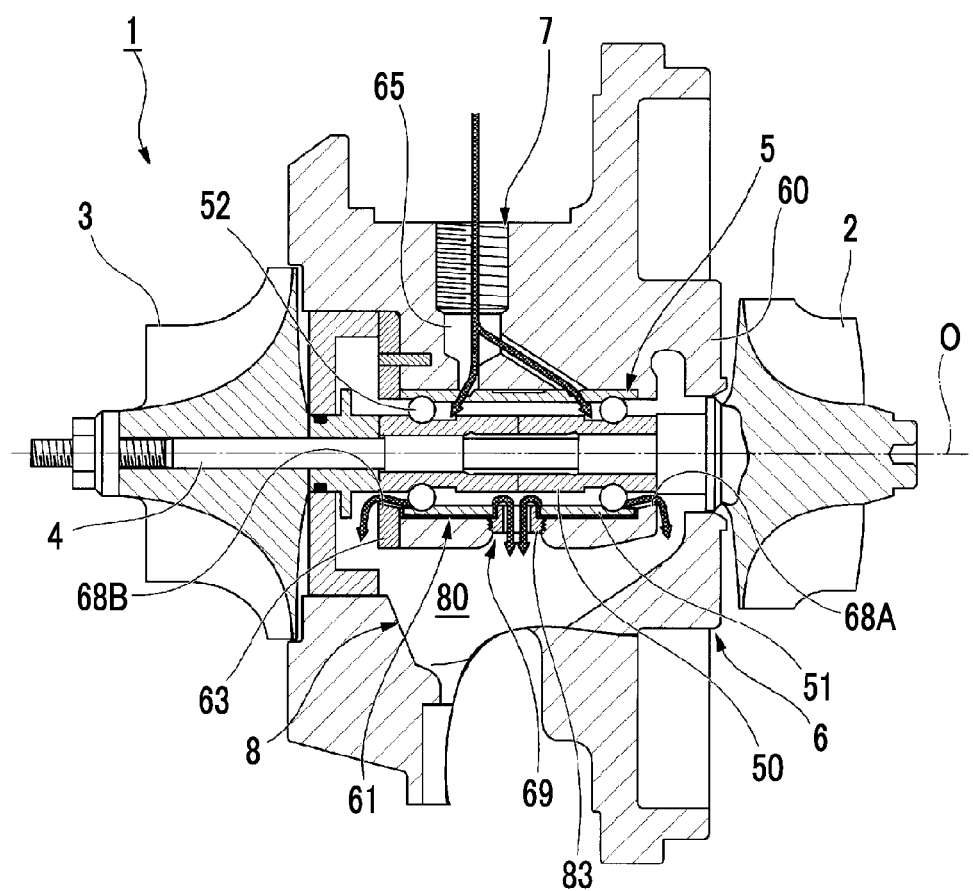
FIG. 1 is a breakaway view of a turbocharger related to a first embodiment of the invention.

A turbocharger 1 related to the first embodiment is illustrated in FIG. 1. As illustrated in FIG. 1, the turbocharger 1 includes a turbine rotor 2, a compressor rotor 3, a rotating shaft 4, a rolling bearing 5, and a housing 6. The turbocharger 1 is provided with an oil supply structure (lubricant supply structure) 7 for supplying lubricating oil (lubricant) to the rolling bearing 5, and an oil discharge structure (lubricant discharge structure) 8 for discharging lubricating oil from the rolling bearing 5. In addition, the turbocharger 1 is mounted on an automobile or the like in a posture such that the rotating shaft 4 extends in a horizontal direction.

In addition, a chain line illustrated in FIG. 1 represents a central axis O of the rotating shaft 4. In the present application, a direction along the central axis O is defined as an "axial direction", a direction orthogonal to the central axis O is defined as a "radial direction", and a direction around the central axis O is defined as a "circumferential direction". A longitudinal direction in FIG. 1 is equivalent to an upward-downward direction in the present application.

In the turbocharger 1, the turbine rotor 2 rotates about the central axis O due to an exhaust gas flow supplied from an engine (not illustrated). In the turbocharger 1, the rotating shaft 4 and the compressor rotor 3 rotate about the central axis O with the rotation of this turbine rotor 2. The turbocharger 1 supplies the air compressed by the rotation of the compressor rotor 3 to the engine.

The turbine rotor 2 and the compressor rotor 3 are disposed side by side laterally (horizontal direction) at a distance from each other. The turbine rotor 2 is combined with the one end part of the rotating shaft 4. The compressor rotor 3 is combined with the other end part of the rotating shaft 4. The rotating shaft 4, the turbine rotor 2, and the compressor rotor 3 are configured to rotate together.

The rolling bearing 5 is a bearing that rotatably supports the rotating shaft 4. The rolling bearing 5 is disposed between the turbine rotor 2 and the compressor rotor 3. The rolling bearing 5 includes an inner ring 50 combined with the rotating shaft 4, an outer ring 51 disposed on a radial outer side of the inner ring 50, a plurality of rolling elements 52 interposed between the inner ring 50 and the outer ring 51, and a cage (not illustrated) holding the plurality of rolling elements 52. In addition, in FIG. 2(b), only one rolling element 52 and the remaining rolling elements are omitted. The inner ring 50 is a cylindrical member disposed coaxially with the rotating shaft 4. The inner ring 50 is attached to the rotating shaft 4 such that the rotating shaft 4 is passed through in the inner ring 50. The outer ring 51 is a cylindrical member disposed coaxially with the rotating shaft 4 and the inner ring 50. The outer ring 51 is disposed such that the inner ring 50 is housed in the outer ring 51 at a distance therefrom over the entire circumferential direction.

As illustrated in FIG. 2(a), raceways 53 that extend over the entire circumferential direction are respectively formed in outer peripheral surfaces of end parts of the inner ring 50 on both sides in the axial direction. Grooved raceways 54 that extend over the entire circumferential direction are respectively formed in inner peripheral surfaces of the end parts of the outer ring 51 on both sides in the axial direction. The raceways 53 and the raceways 54 are disposed at positions that face each other in the radial direction. The plurality of rolling elements 52 lined up in the circumferential direction are sandwiched between the raceways 53 and the raceways 54 that face each other.

An inner peripheral surface of the outer ring 51 has a central region 55 located closer to an axial inner side (between the raceway 54 and the raceway 54 on both sides) than the raceways 54, and end part regions 56 located closer to axial outer sides than the raceways 54. The internal diameter (twice larger than the distance from the central axis O to the end part regions 56) of the end part regions 56 is larger than the internal diameter (twice larger than the distance from the central axis O to the central region 55) of the central region 55 and is smaller than the internal diameter (twice larger than the distance from the central axis O to groove bottoms of the raceways 54) of the raceways 54.

Figure 2:
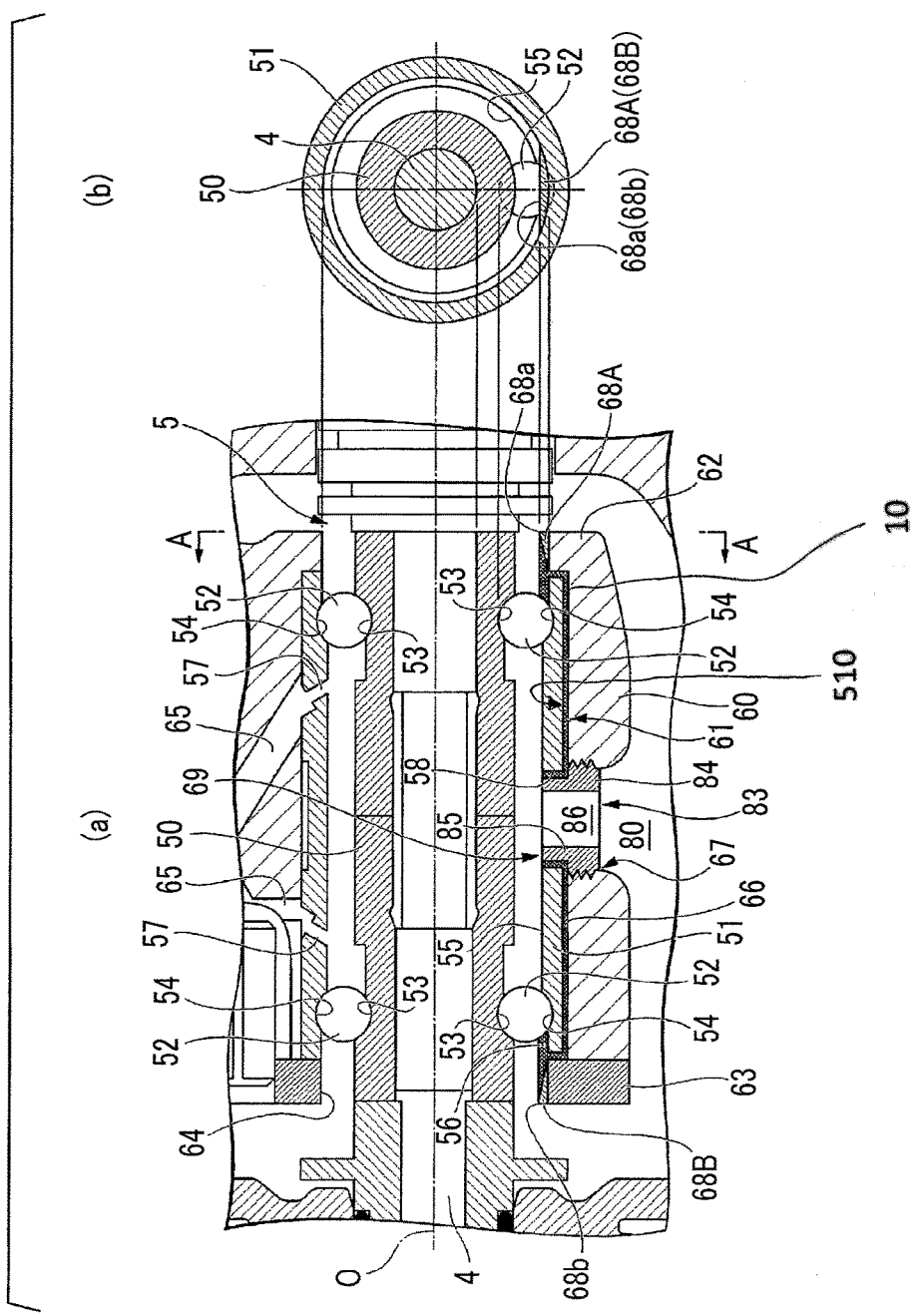
FIG. 2(a) is a sectional view around a rolling bearing in the first embodiment of the invention.
FIG. 2(b) is an end view of a rolling bearing and a space of a housing in the first embodiment of the invention, and a sectional view as seen from arrow A-A.
Figure 3:
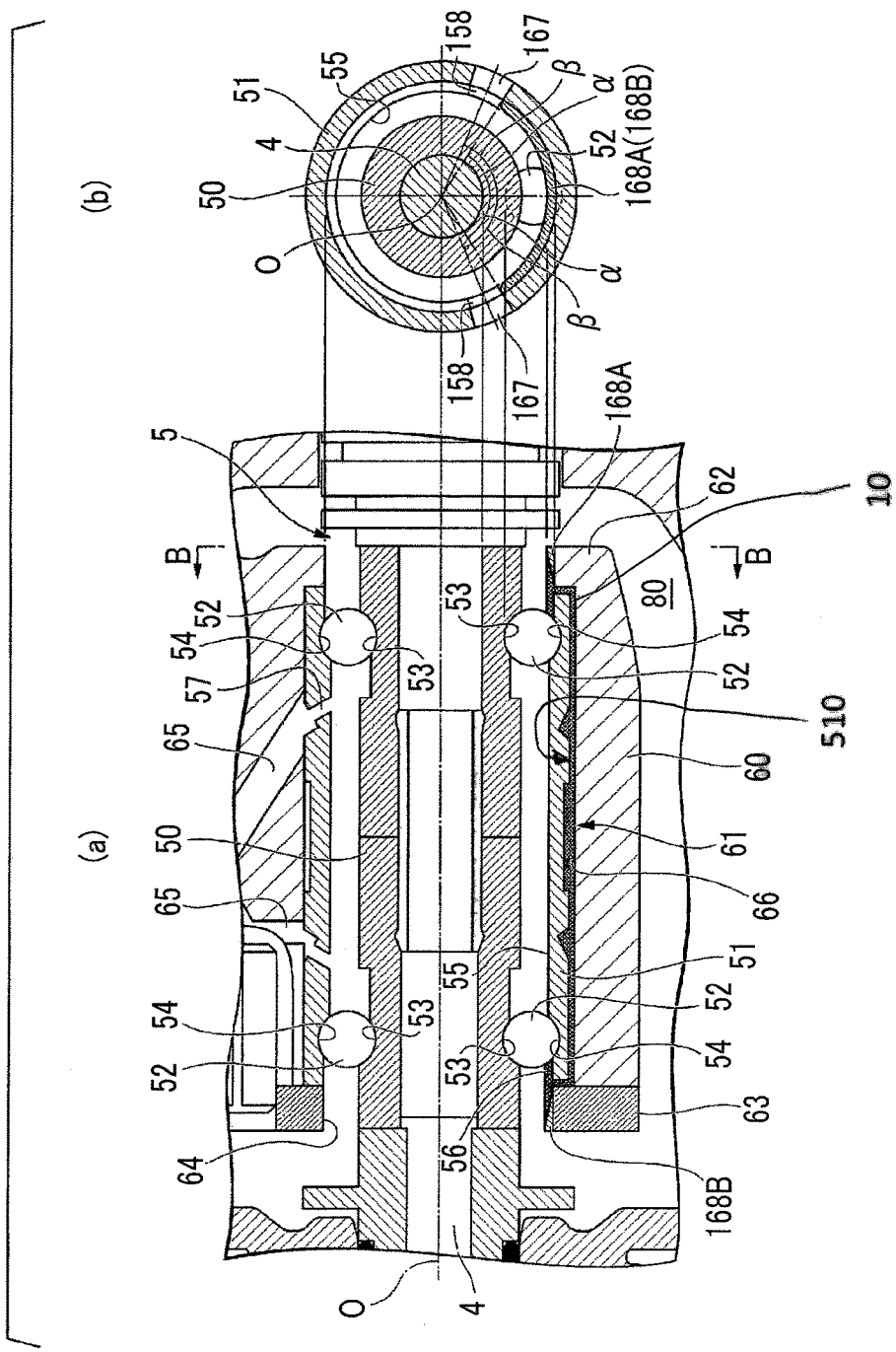
FIG. 3(a) is a sectional view around a rolling bearing in a second embodiment of the invention.
FIG. 3(b) is an end view of a rolling bearing and a space of a housing in the second embodiment of the invention, and a sectional view as seen from arrow B-B.

As illustrated in FIG. 1, the housing 6 includes a main housing body 60 in which a space 61 that houses the rolling bearing 5 is formed. The main housing body 60 is fixed to a vehicle body or the like. The main housing body 60 is provided with a thrust receiving part 62 that receives the thrust load of the rolling bearing 5 on the turbine rotor 2 side. The thrust receiving part 62 is a flanged portion that protrudes to the radial inner side with respect to an inner peripheral surface of the space 61. The thrust receiving part 62 is disposed adjacent to the turbine rotor 2 side of the space 61. A portion of an end part of the outer ring 51 of the rolling bearing 5 on the turbine rotor 2 side abuts against the thrust receiving part 62. The housing 6 includes a thrust receiving member 63 that receives the thrust load of the rolling bearing 5 on the compressor rotor 3 side. The thrust receiving member 63 is a plate-shaped member fixed to the main housing body 60. The thrust receiving member 63 is disposed adjacent to the compressor rotor 3 side of the space 61. The thrust receiving member 63 has a circular opening 64 that communicates with the space 61. A portion of an end part of the outer ring 51 of the rolling bearing 5 on the compressor rotor 3 side abuts against a circumferential edge of the opening 64. The housing 6 holds the outer ring 51 when the outer ring 51 is fitted into the space 61 and the outer ring 51 is sandwiched between the above thrust receiving part 62 and thrust receiving member 63. Space 61 is formed between the bottom part 10 of the peripheral wall of the housing 6 and the bottom part 510 of the outer ring 51 as shown in FIGS. 2 and 3.

An oil supply structure 7 includes a first oil supply passage along which the lubricating oil is supplied to a space between the outer ring 51 and the inner ring 50 in order to apply the lubricating oil to between the raceways 53 and the raceways 54, and the rolling elements 52, and a second oil supply passage along which the lubricating oil is supplied between an outer peripheral surface of the outer ring 51 and the inner peripheral surface of the space 61 in order to form an oil film between the outer peripheral surface of the outer ring 51 and the inner peripheral surface of the space 61.

The first oil supply passage is constituted by an oil supply flow passage 65 formed in an upper portion (an upper portion of the space 61) of the main housing body 60, and an oil supply port 57 formed in an upper portion of the outer ring 51. The second oil supply passage is constituted by the above-mentioned oil supply flow passage 65, and a clearance 66 formed between the outer peripheral surface of the outer ring 51 and the inner peripheral surface of the space 61. The oil supply flow passage 65 is a passage through which the lubricating oil supplied from the outside of the housing 6 flows. In the oil supply flow passage 65, the lubricating oil flows from an upper side toward a lower side. The oil supply port 57 is a hole that penetrates the outer ring 51 upward and downward. The oil supply port 57 communicates with the oil supply flow passage 65. The oil supply port 57 is located between the raceway 54 and the raceway 54 on both sides in the axial direction. The oil supply port 57 makes a portion of the lubricating oil flowing through the oil supply flow passage 65 flow into a space between the outer ring 51 and the inner ring 50. Although the oil supply port 57 is located immediately above (vertically above) the central axis O, the oil supply port 57 may be disposed at a position shifted in the circumferential direction on the basis of the position immediately above the central axis O. The clearance 66 communicates with the oil supply flow passage 65. The clearance 66 is able to make a portion of the lubricating oil flowing through the oil supply flow passage 65 flow thereinto. The clearance 66 is formed over the entire circumferential direction. The clearance 66 is particularly preferably formed over the entire outer peripheral surface of the outer ring 51, and thereby, an oil film can be formed between the outer peripheral surface of the outer ring 51 and the inner peripheral surface of the space 61.

The oil discharge structure 8 includes a first oil discharge passage (first discharge passage) along which the lubricating oil within the rolling bearing 5 and the clearance 66 is discharged from opening ends of the outer ring 51 on both sides in the axial direction, and a second oil discharge passage (second discharge passage) along which the lubricating oil within the rolling bearing 5 and the clearance 66 is discharged from an opening 58 and an opening 67 that are aligned and formed so as to communicate with the outer ring 51 and a peripheral wall part of the space 61, respectively.

The first oil discharge passage is constituted from the opening ends of the outer ring 51 on both sides in the axial direction, the opening 64 of the thrust receiving member 63, and an oil discharge flow passage 80 formed in a lower portion of the main housing body 60. The oil discharge flow passage 80 is a passage that allows the lubricating oil discharged from the rolling bearing 5 to flow therethrough and be discharged to the outside of the housing 6. In the oil discharge flow passage 80, the lubricating oil flows from the upper side toward the lower side. The opening 64 communicates with the oil discharge flow passage 80. The opening 64 makes the lubricating oil, which has flowed out of the opening ends of the outer ring 51 on both sides in the axial direction, flow into the oil discharge flow passage 80 therethrough.

The opening (housing opening) 67 of the peripheral wall part of the space 61 that constitutes the second oil discharge passage is a female thread hole that penetrates a bottom part of the space 61 upward and downward. The housing opening 67 is disposed at an axially intermediate portion of the space 61. The opening (outer ring opening) 58 of the outer ring 51 that constitutes the second oil discharge passage is a through-hole that penetrates a bottom part of the outer ring 51 upward and downward. The outer ring opening 58 is disposed at an axially intermediate portion of the outer ring 51. The housing opening 67 and the outer ring opening 58 are formed at positions that are aligned with each other so as to communicate with each other.

As illustrated in FIG. 2(a), the turbocharger 1 related to the present embodiment includes a first dam 68A and a first dam 68B that restrict the outflow of the lubricating oil through the first oil discharge passage, and a second dam 69 that restricts the outflow of the lubricating oil through the second oil discharge passage. The first dam 68A, the first dam 68B, and the second dam 69 are respectively provided in the housing 6. The first dam 68A and the first dam 68B are disposed adjacent to lower portions of the opening ends of the outer ring 51. The second dam 69 is disposed in the housing opening 67 and the outer ring opening 58.

Specifically, the first dam 68A on the turbine rotor 2 side is provided at a lower portion of the thrust receiving part 62 of the main housing body 60. The first dam 68B on the compressor rotor 3 side is provided at a lower portion of the opening 64 of the thrust receiving member 63. The first dam 68A and the first dam 68B become gradually high toward the opening end side of the outer ring 51 to the axial outer side. The height positions of a top part 68a and a top part 68b of the first dam 68A and the first dam 68B are equal to the height position of the central region 55 of the inner peripheral surface of the outer ring 51. That is, in a vertical sectional view cut at the position of the central axis O, the top part 68a of the first dam 68A and the top part 68b of the first dam 68B are located on an extension line of the central region 55 of the inner peripheral surface of the outer ring 51. As illustrated in FIG. 2(b), the top part 68a of the first dam 68A and the top part 68b of the first dam 68B extend substantially horizontally in a direction orthogonal to the central axis O. The top part 68a of the first dam 68A and the top part 68b of the first dam 68B has a shape assuming a substantially crescent shape in a plan view.

The second dam 69 is formed by a perforated pin 83 attached to the housing opening 67 and the outer ring opening 58. The perforated pin 83 has a fastening part 84 fastened to the housing opening 67, an insertion part 85 inserted into the inside of the outer ring opening 58, and a discharge hole 86 having an upper end open to a space between the outer ring 51 and the inner ring 50 and having a lower end open to the oil discharge flow passage 80 outside the space 61. The fastening part 84 is a male thread part screwed into the housing opening 67. The insertion part 85 protrudes upward from an upper end of the fastening part 84 and is inserted into the outer ring opening 58. A clearance that allows the lubricating oil to be circulated therethrough is formed between an outer peripheral surface of the insertion part 85 and an inner peripheral surface of the outer ring opening 58. The height position of the tip of the insertion part 85 is equal to the height position of the central region 55 of the inner peripheral surface of the outer ring 51, and is flush with the central region 55 of a tip surface of the insertion part 85 and the inner peripheral surface of the outer ring 51. The discharge hole 86 is a hole for allowing the lubricating oil between the outer ring 51 and the inner ring 50 to be discharged therethrough. The internal diameter of the discharge hole 86 is set such that a required sufficient amount of the lubricating oil can be circulated.

In the turbocharger 1 of the above configuration, during the operation of the turbocharger 1, the lubricating oil is supplied to the space between the outer ring 51 of the rolling bearing 5 through the first oil supply passage of the oil supply structure 7 and the inner ring 50, and the lubricating oil is supplied to an outer periphery of the outer ring 51 through the second oil supply passage of the oil supply structure 7. That is, during operation of a turbocharger 1, the lubricating oil is supplied from an oil supply source (not illustrated) outside the housing 6 to the oil supply flow passage 65. A portion of the lubricating oil is supplied to between the outer ring 51 and the inner ring 50 through the oil supply port 57 of the outer ring 51. The remainder of the lubricating oil is supplied to the clearance 66 between the outer peripheral surface of the outer ring 51 and the inner peripheral surface of the space 61. The lubricating oil supplied to between the outer ring 51 and the inner ring 50 flows on the inner peripheral surface of the outer ring 51 and the outer peripheral surface of the inner ring 50, and enters between the raceways 53 and the raceways 54, and the rolling elements 52. Accordingly, the friction between the raceways 53 and the raceways 54, and the rolling elements 52 is reduced, and malfunctions, such as seizure, wear, or cracking between the raceways 53 and the raceways 54, and the rolling elements 52, or separation of the rolling elements 52, can be prevented.

The lubricating oil supplied to the clearance 66 flows through the inside of the clearance 66, and spreads, and an oil film is formed between the outer peripheral surface of the outer ring 51 and the inner peripheral surface of the space 61. Accordingly, a damping effect caused by a squeeze film damper phenomenon of this oil film is exhibited and the vibration during the operation of the turbocharger 1 is damped. At the time of the damping resulting from the above-mentioned oil film, the lubricating oil between the outer peripheral surface of the outer ring 51 and the inner peripheral surface of the space 61 does not escapes out of the housing opening 67 but first rises through between the outer peripheral surface of the insertion part 85 of the perforated pin 83 and the inner peripheral surface of the outer ring opening 58, and then escapes. For this reason, compared to a case where the lubricating oil between the outer peripheral surface of the outer ring 51 and the inner peripheral surface of the space 61 escapes from the housing opening 67, escape resistance of the lubricating oil at the time of the damping becomes large.

In the turbocharger 1 of the above configuration, simultaneously with the above-described supply of the lubricating oil, the lubricating oil is discharged through the first oil discharge passage and the second oil discharge passage of the oil discharge structure 8 from the space between the outer ring 51 and the inner ring 50, and the clearance 66. That is, the lubricating oil within the space between the outer ring 51 and the inner ring 50 and the lubricating oil within the clearance 66 flow over the first dam 68A or the first dam 68B, and are discharged from the opening ends of the outer ring 51 on both sides in the axial direction to the oil discharge flow passage 80 outside the rolling bearing 5. In this case, the height positions of the top part 68a of the first dam 68A and the top part 68b of the first dam 68B are equal to the height position of the central region 55 of the inner peripheral surface of the outer ring 51. For that reason, a sufficient amount of lubricating oil flows over the first dam 68A and the first dam 68B from the opening ends of the outer ring 51, and is discharged. The lubricating oil within the space between the outer ring 51 and the inner ring 50 is discharged to the oil discharge flow passage 80 outside the rolling bearing 5 through the discharge hole 86 of the perforated pin 83, and the lubricating oil within the clearance 66 flows over the second dam 69 and is discharged to the oil discharge flow passage 80 outside the rolling bearing 5 through the discharge hole 86 of the perforated pin 83.

In the turbocharger 1 of the above configuration, the perforated pin 83 having the fastening part 84 fastened to the housing opening 67 and the insertion part 85 inserted into the inside of the outer ring opening 58 function as a detent member (positioning member) of the outer ring 51. That is, the rotation of the outer ring 51 around the relative central axis O with respect to the housing 6 is restricted by the perforated pin 83 even if a shape for positioning in the outer ring 51 or the housing 6 is not formed.

In the turbocharger 1 of the above configuration, in a case where the operation of the turbocharger 1 has stopped and the supply of oil has stopped, the discharge of oil from the first oil discharge passage and the second oil discharge passage continues for a while after that, and the discharge of oil is also stopped after that. In this case, the lubricating oil that is dammed by the first dam 68A, the first dam 68B, and the second dam 69 stagnates at the bottom inside the outer ring 51 and the bottom of the space 61 without being discharged. Therefore, even in a case where oil supply has stopped over a long period of time, the lubricating oil is not completely discharged but the lubricating oil stagnates at the bottom inside the outer ring 51 and the bottom of the space 61. Thereafter, when the turbocharger 1 has started, oil supply delay occurs. However, the lubricity between the raceways 53 and the raceways 54, and the rolling elements 52 is sufficiently guaranteed from immediately after the starting of the turbocharger 1 by the lubricating oil that has stagnated at the bottom inside the outer ring 51. In addition, an oil film is formed at the outer periphery of the outer ring 51 from immediately after the starting of the turbocharger 1 by the lubricating oil that has stagnated at the bottom of the space 61.

Hence, seizure of the raceways 53 and the raceways 54, and the rolling elements 52 can be prevented, damage, such as wear or cracking of the surfaces of the raceways 53 and the raceways 54 or the surfaces of the rolling elements 52, can be prevented, the rolling elements 52 can be prevented from being separating from the raceways 53 and the raceways 54 due to the above-described wear, or other malfunctions can be prevented. The damping effect caused by the oil film at the outer periphery of the outer ring 51 can be exhibited from immediately after starting, and vibration is damped from immediately after starting. As a result, noise can be reduced, and seizure and wear of the outer peripheral surface of the outer ring 51 can be prevented. According to the turbocharger 1 of the first embodiment, the escape resistance of the lubricating oil at the time of the damping becomes large. For that reason, the damping effect can be improved.

According to the turbocharger 1 of the first embodiment, the oil discharge performance under the operation of the turbocharger 1 can also sufficiently guaranteed. For that reason, an increase in bearing loss or a temperature rise resulting from the lubricating oil not being sufficiently discharged can be prevented.

It is not necessary to form a shape for positioning in the outer ring 51 or the housing 6. For that reason, part costs can be inhibited from becoming high. In order to form an oil reservoir structure, it is not necessary to prepare a special rolling bearing (for example, a rolling bearing that provides a recess in an outer ring surface), and a general rolling bearing can be used. As a result, part costs can be inhibited from becoming high.

Second Embodiment

Next, a turbocharger related to a second embodiment will be described. The turbocharger related to the second embodiment includes a first dam 168A and a first dam 168B that is circular-arc in the plan view, instead of the first dam 68A and the first dam 68B having a substantially crescent shape in the plan view in the above-described first embodiment. In the turbocharger related to the second embodiment, as a configuration for restricting the outflow of the lubricating oil through the second oil discharge passage, a configuration in which the circumferential positions of openings (outer ring opening) 158 of the outer ring 51 and openings (housing openings) 167 of the space 61 are as follows is provided instead of the second dam 69 in the above-described first embodiment. In addition, the same components as those of the turbocharger 1 related to the above-described first embodiment will be designated by the same reference signs, and the description thereof will be appropriately omitted.

In FIG. 3, a configuration around the rolling bearing 5 in the turbocharger 1 related to the second embodiment is illustrated. As illustrated in FIG. 3(*a*), the first dam 168A and the first dam 168B are disposed adjacent to the lower portions of the opening ends of the outer ring 51 on both sides in the axial direction. As illustrated in FIG. 3(*b*), the first dam 168A (168B) has a circular-arc shape centered on the central axis O of the rotating shaft 4 in a plan view. That is, the first dam 168A (168B) extends in a circular-arc shape along an internal diameter edge of an opening end of the outer ring 51. The first dam 168A (168B) extends equally leftward and rightward in the plan view. End parts of the first dam 168A (168B) are located at positions rotated by a predetermined rotational angle α around the central axis O from a position (0 degree) immediately below (a lower side in the vertical direction) the central axis O of the rotating shaft 4 to both sides, respectively.

Figure 4:
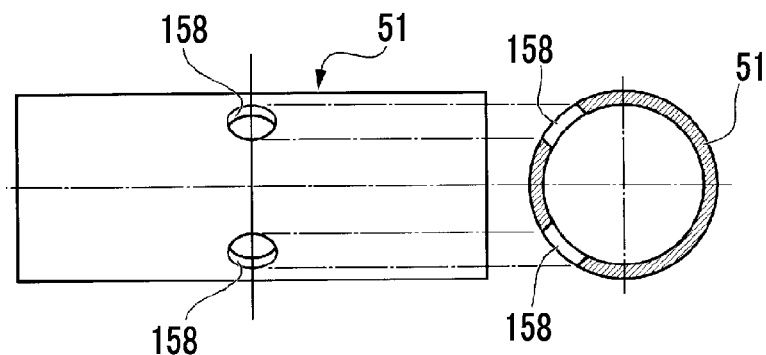
FIG. 4 is a bottom view of an outer ring of the rolling bearing in the second embodiment of the invention.

As illustrated in FIG. 3(*a*) and FIG. 3(*b*), in the turbocharger 1 related to the second embodiment, no opening is formed at the bottom part of the outer ring 51 or the bottom part of the peripheral wall part of the space 61. In the turbocharger 1 related to the second embodiment, as illustrated in FIG. 3(*b*), the outer ring openings 158 are located at side parts between the bottom part and a top part of the outer ring 51. The housing openings 167 are located at side parts between the bottom part and a top part of the peripheral wall part of the space 61. The outer ring openings 158 and the housing openings 167 are aligned with each other so as to communicate with each other. Oil discharge holes for discharging the lubricating oil are constituted by the outer ring openings 158 and the housing openings 167. As illustrated in FIG. 4, the outer ring openings 158 are respectively provided at the side parts on both sides of the outer ring 51. The outer ring openings 158 on both sides have the same shape and opening area as each other. The outer ring openings 158 on both sides are disposed at positions that are bisymmetrical to each other. In addition, the same apply to the housing openings 167, and are respectively provided at the side parts on both sides of the peripheral wall part of the space 61. The housing openings 167 on both sides have the same shape and opening area as each other. The housing openings 167 on both sides are disposed at positions that are bisymmetrical to each other. As illustrated in FIG. 3(b), the circumferential positions of the outer ring openings 158 and the housing openings 167 are positions rotated by a predetermined rotational angle β around the central axis O from the position (0 degree) immediately below (the lower side in the vertical direction) the central axis O of the rotating shaft 4. This rotational angle β is an angle within a range of $0°<β<±180°$, and the rotational angle β is preferably ±90° or less. It is preferable that the rotational angle β is an angle such that the circumferential position of edge parts of the outer ring openings 158 and the circumferential positions of end parts of the first dam 168A (168B) coincide with each other in a plan view.

In the turbocharger 1 of the above-described configuration, the first dam 168A and the first dam 168B are disposed adjacent to the lower portions of the opening ends of the outer ring 51. The outer ring openings 158 are located at the side parts of the outer ring 51 in the turbocharger 1. In the turbocharger 1, the housing openings 167 are located at the side parts of the peripheral wall part of the space 61. For that reason, in a case where supply of the lubricating oil has stopped, the lubricating oil dammed by the first dam 168A or the first dam 168B is not discharged from the outer ring openings 158 and the housing openings 167 but stagnates at the bottom inside the outer ring 51 or the bottom of the space 61. Therefore, when the turbocharger 1 has started after the stop of supply of the lubricating oil over a long period of time, even if the supply delay of the lubricating oil occurs, the lubricity between the raceways 53 and the raceways 54, and the rolling elements 52 is sufficiently guaranteed from immediately after the starting of the turbocharger 1 by the lubricating oil that has stagnated at the bottom inside the outer ring 51. In addition, an oil film is formed at the outer periphery of the outer ring 51 from immediately after the starting of the turbocharger 1 by the lubricating oil that has stagnated at the bottom of the space 61, and the damping effect of vibration is obtained by this oil film. As a result, noise can be reduced. Particularly, according to the turbocharger 1 related to this embodiment, it is not necessary to use additional components, and the number of components does not increase.

In the turbocharger 1 of the above-described configuration, the first dam 168A and the first dam 168B have a circular-arc shape centered on the central axis O. For that reason, high robustness over the posture of the turbocharger 1 is provided. More specifically, even in a case where the operation of the turbocharger 1 has stopped and the supply of the lubricating oil has stopped in the state where the posture of the turbocharger 1 is inclined so as to rotate around the central axis O, the lubricating oil is dammed by a portion of the circular-arc first dam 168A or the circular-arc first dam 168B if the inclination degree of the turbocharger 1 is made smaller than the above rotational angle β. As a result, the lubricating oil stagnates at the bottom inside the outer ring 51 or the bottom of the space 61. Accordingly, malfunctions, such as seizure, wear, or cracking of the rolling bearing 5 resulting from the shortage of the lubricating oil, can be prevented more reliably. In addition, the damping effect of vibration by the oil film at the outer periphery of the outer ring 51 can be exhibited more reliably.

In the turbocharger 1 of the above-described configuration, the outer ring openings 158 are respectively formed at the side parts on both sides of the outer ring 51. For that reason, guaranteeing desired oil discharge performance, the opening area of the outer ring openings 158 can be made small, and the rigidity of the outer ring 51 can be improved.

Although the first embodiment and the second embodiment of the invention have been described above in detail with reference to the drawings, specific configuration is not limited to these embodiments, and design changes are also included without departing from the scope of the invention.

In addition, in the above-described first embodiment, the turbocharger 1 including the crescent first dam 68A and the crescent first dam 68B and including the second dam 69 formed by the perforated pin 83 has been described. In the above-described second embodiment, the turbocharger 1 including the circular-arc first dam 168A and the circular-arc first dam 168B and including the oil discharge holes consisting of the outer ring openings 158 formed at the side parts of the outer ring 51 and the housing openings 167 formed at the side parts of the space 61 has been described. However, the invention is not limited to these embodiments, and the above-described constituent elements can be combined appropriately. For example, a turbocharger including the circular-arc first dam 168A and the circular-arc first dam 168B and including the second dam 69 formed by the perforated pin 83 may be adopted. For example, a turbocharger including the crescent first dam 68A and the crescent first dam 68B and including the oil discharge holes consisting of the outer ring openings 158 formed at the side parts of the outer ring 51 and the housing openings 167 formed at the side parts of the space 61 may be adopted.

In the above-described first embodiment, the second dam 69 is formed by the perforated pin 83. However, the invention is not limited to this. For example, a configuration in which a second dam formed integrally with the housing 6 (the peripheral wall part of the space 61) may be adopted. In the above-described first embodiment, the central region 55 of the tip surface of the insertion part 85 of the perforated pin 83 and the inner peripheral surface of the outer ring 51 are flush with each other. However, the invention is not limited to this. For example, a configuration in which the tip surface of the insertion part 85 of the perforated pin 83 protrudes closer to the radial inner side than the central region 55 of the inner peripheral surface of the outer ring 51 may be adopted, or a configuration in which the tip surface of the insertion part 85 of the perforated pin 83 is located closer to the radial outer side than the central region 55 of the inner peripheral surface of the outer ring 51 while protruding closer to the radial inner side than the inner peripheral surface of the space 61 may be adopted.

In the above-described first embodiment, the height positions of the top part 68a of the first dam 68A and the top part 68b of the first dam 68B are equal to the height position of the central region 55 of the inner peripheral surface of the outer ring 51. However, the invention is not limited to this. For example, a configuration in which the height positions of the top part 68a of the first dam 68A and the top part 68b of the first dam 68B are located closer to the radial outer side than the height position of the central region 55 of the inner peripheral surface of the outer ring 51 may be adopted, or a configuration in which the height positions of the top part 68a of the first dam 68A and the top part 68b of the first dam 68B are located closer to the radial inner side than the height position of the central region 55 of the inner peripheral surface of the outer ring 51 may be adopted.

Figure 5A:
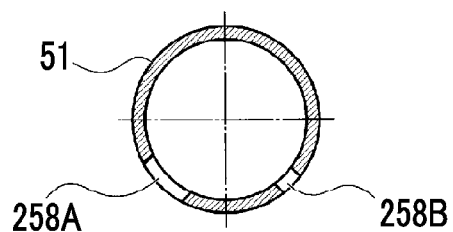
FIG. 5A is a sectional view of an outer ring of a rolling bearing illustrating a modification example of the invention.
Figure 5B:
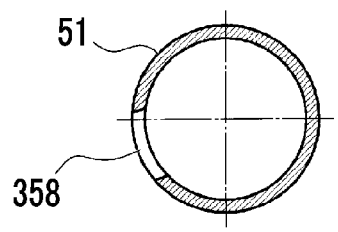
FIG. 5B is a sectional view of an outer ring of a rolling bearing illustrating a modification example of the invention.
Figure 5C:
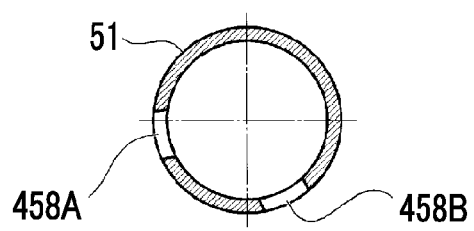
FIG. 5C is a sectional view of an outer ring of a rolling bearing illustrating a modification example of the invention.

In the above-described second embodiment, the outer ring openings 158 on both sides have the same shape and opening area as each other. However, the invention is not limited to this. For example, as illustrated in FIG. 5A, a configuration in which the shapes and opening areas (sizes) of an outer ring opening 258A and an outer ring opening 258B on both sides are different from each other may be adopted. In the above-described second embodiment, the outer ring openings 158 are respectively provided at the side parts on both sides of the outer ring 51. However, the invention is not limited to this. For example, as illustrated in FIG. 5B, a configuration in which an outer ring opening 358 is provided only at one side part of the outer ring 51 may be adopted. In the above-described second embodiment, the outer ring openings 158 on both sides are disposed at the positions that are bisymmetrical to each other. However, the invention is not limited to this. For example, as illustrated in FIG. 5C, an outer ring opening 458A and an outer ring opening 458B on both sides may be disposed at positions that are non-bisymmetrical to each other.

In the above embodiment, the first dam 68A (168A) on the turbine rotor 2 side is provided in the thrust receiving part 62 of the main housing body 60, and the first dam 68B (168B) on the compressor rotor 3 side is provided in the thrust receiving member 63 that is a separate component from the main housing body 60. However, the invention is not limited to this. For example, a configuration in which a first dam on the turbine rotor side is provided in a member that is a separate component from the main housing body 60 may be adopted, or a configuration in which a first dam on the compressor rotor side is provided in a portion of the main housing body 60 may be adopted.

In the above embodiment, the turbocharger 1 is configured to include one rolling bearing 5. However, the invention is not limited to this. For example, a plurality of the rolling bearings may be configured to be arranged in series in the axial direction. In the above embodiment, the outer ring opening 58, the housing opening 67, and the housing openings 167 have the same shape (circular shape). However, the invention is not limited to this. For example, a configuration in which an outer ring opening has a circular shape, whereas a housing opening has an elliptical shape, may be adopted. In addition, it is possible to appropriately change the constituent elements in the above-described embodiment with well-known constituent elements without depart from the scope of the invention. Additionally, the above-described modification examples may be combined appropriately.

INDUSTRIAL APPLICABILITY

According to the above turbocharger, even in a case where the supply of the lubricant has stopped over a long period of time, the lubricant is secured between the rolling elements and the raceways and between the outer peripheral surface of the outer ring and the inner peripheral surface of the space, from immediately after starting. For that reason, the damping effect can be obtained from immediately after starting. As a result, noise can be reduced, and malfunctions such that seizure occurs, damage, such as wear or cracking, occurs, or the rolling elements are separated, can be prevented.

REFERENCE SIGNS LIST

1: Turbocharger
2: Turbine Rotor
3: Compressor Rotor
4: Rotating Shaft
5: Rolling Bearing
6: Housing
7: Oil Supply Structure (Lubricant Supply Structure)
8: Oil Discharge Structure (Lubricant Discharge Structure)
50: Inner Ring
51: Outer Ring
52: Rolling Element
53, 54: Raceway
55: Central Region
56: End Part Region
57: Oil Supply Port
58, 158, 258A, 258B, 358, 458A, 458B: Outer Ring Opening (Opening)
60: Main Housing Body
61: Space
62: Thrust Receiving Part
63: Thrust Receiving Member
64: Opening
65: Oil Supply Flow Passage
66: Clearance
67, 167: Housing Opening (Opening)
68A, 68B, 168A, 168B: First Dam
68a, 68b: Top Part
69: Second Dam
80: Oil Discharge Flow Passage
83: Perforated Pin
84: Fastening Part
85: Insertion Part
86: Discharge Hole
O: Central Axis

The invention claimed is:

1. A turbocharger comprising:
a rotating shaft that is combined with a turbine rotor and a compressor rotor, which are disposed side by side, respectively, and rotates together with the turbine rotor and the compressor rotor;
a rolling bearing that includes an inner ring combined with the rotating shaft, an outer ring disposed on a radial outer side of the inner ring, and a plurality of rolling elements sandwiched between a raceway of the inner ring and a raceway of the outer ring, and supports the rotating shaft;
a housing that has a housing space which houses the rolling bearing and holds the outer ring fitted into this housing space;
a lubricant supply structure for supplying a lubricant to an internal space between the outer ring and the inner ring and to a clearance between an outer peripheral surface of the outer ring and an inner peripheral surface of the housing, respectively; and
a lubricant discharge structure having a first discharge passage for discharging the lubricant from opening ends of the outer ring on both sides in an axial direction, and a second discharge passage for discharging the lubricant from openings aligned and formed so as to communicate with an axially intermediate portion of the outer ring and a peripheral wall part of the housing, respectively,
wherein the housing includes
a first dam that is disposed adjacent to a lower portion of each opening end of the outer ring and restricts an outflow of the lubricant through the first discharge passage, and
a second dam that is disposed in the openings formed in the outer ring and the peripheral wall part of the housing and restricts an outflow of the lubricant through the second discharge passage,
wherein an end part region which connects the raceway formed in a groove shape and an end part of the outer ring facing in the axial direction is formed on the inner peripheral surface of the outer ring, wherein a radial position of the end part region is located radially inward relative to the radial outermost portion of the raceway formed on the outer ring, wherein a radial position of a top part of each first dam is located radially inward relative to the end part region, wherein one open end of the clearance communicates with the internal space between the outer ring and the inner ring between the end part of the outer ring and one of the first dams, and wherein another open end of the clearance communicates with the internal space between the outer ring and the inner ring between the openings formed in the outer ring and the second dam.

2. The turbocharger according to claim 1,
wherein the second dam is formed by a perforated pin including
a fastening part fastened to the openings formed in the peripheral wall part of the housing, an insertion part inserted into the inside of the openings formed in the outer ring, and
a discharge hole having one end open to the internal space between the outer ring and the inner ring and having the other end open to the outside of the housing space.

3. The turbocharger according to claim 2,
wherein the first dams have a circular-arc shape centered on a central axis of the rotating shaft.

4. The turbocharger according to claim 2,
wherein a height position of a top part of each first dam is equal to a height position of a region in an inner peripheral surface of the outer ring closer to an axial inner side than the rolling elements.

5. The turbocharger according to claim 1,
wherein the first dams have a circular-arc shape centered on a central axis of the rotating shaft.

6. The turbocharger according to claim 5,
wherein a height position of a top part of each first dam is equal to a height position of a region in an inner peripheral surface of the outer ring closer to an axial inner side than the rolling elements.

7. The turbocharger according to claim 1,
wherein a height position of a top part of each first dam is equal to a height position of a region in an inner peripheral surface of the outer ring closer to an axial inner side than the rolling elements.

8. A turbocharger comprising:
a rotating shaft that is combined with a turbine rotor and a compressor rotor, which are disposed side by side, respectively, and rotates together with the turbine rotor and the compressor rotor;
a rolling bearing that includes an inner ring combined with the rotating shaft, an outer ring disposed on a radial outer side of the inner ring, and a plurality of rolling elements sandwiched between a raceway of the inner ring and a raceway of the outer ring, and supports the rotating shaft;
a housing that has a housing space which houses the rolling bearing and holds the outer ring fitted into this housing space;
a lubricant supply structure for supplying a lubricant to an internal space between the outer ring and the inner ring and to a clearance between an outer peripheral surface of the outer ring and an inner peripheral surface of the housing, respectively; and
a lubricant discharge structure having a first discharge passage for discharging the lubricant from opening ends of the outer ring on both sides in an axial direction, and a second discharge passage for discharging the lubricant from openings aligned and formed so as to communicate with an axially intermediate portion of the outer ring and a peripheral wall part of the housing, respectively,
wherein the housing is provided with a first dam that is disposed adjacent to a lower portion of each opening end of the outer ring and restricts an outflow of the lubricant through the first discharge passage,
wherein the openings formed in the peripheral wall part of the outer ring and the housing are located at side parts of the outer ring and the housing between bottom parts of the outer ring and the housing and top parts of the outer ring and the housing,
wherein an end part region which connects the raceway formed in a groove shape and an end part of the outer ring facing in the axial direction is formed on the inner peripheral surface of the outer ring,
wherein a radial position of the end part region is located radially inward relative to the radial outermost portion of the raceway formed on the outer ring,
wherein a radial position of a top part of each first dam is located radially inward relative to the end part region, and
wherein the clearance communicates with the internal space between the outer ring and the inner ring between the end part of the outer ring and one of the first dams.

9. The turbocharger according to claim 8,
wherein the first dams have a circular-arc shape centered on a central axis of the rotating shaft.

10. The turbocharger according to claim 8,
wherein a height position of a top part of each first dam is equal to a height position of a region in an inner peripheral surface of the outer ring closer to an axial inner side than the rolling elements.

* * * * *